US011597796B2

(12) United States Patent
Wang et al.

(10) Patent No.: US 11,597,796 B2
(45) Date of Patent: Mar. 7, 2023

(54) IONIC AQUEOUS EPOXY CURING AGENT, PREPARATION METHOD THEREFOR AND USE THEREOF

(71) Applicants: WANHUA CHEMICAL GROUP CO., LTD., Shandong (CN); WANHUA CHEMICAL (NINGBO) CO., LTD.

(72) Inventors: Xiao Wang, Shandong (CN); Xueshun Ji, Shandong (CN); Weifei Li, Shandong (CN); Rui Qu, Shandong (CN); Chengbin Zhang, Shandong (CN); Junying Deng, Shandong (CN); Jiakuan Sun, Shandong (CN); Bin Zhou, Shandong (CN); Qiao Wang, Shandong (CN); Ji Gong, Shandong (CN)

(73) Assignees: WANHUA CHEMICAL GROUP CO., LTD., Shandong (CN); WANHUA CHEMICAL (NINGBO) CO., LTD., Zhejiang (CN)

( * ) Notice: Subject to any disclaimer, the term of this patent is extended or adjusted under 35 U.S.C. 154(b) by 3 days.

(21) Appl. No.: 17/288,334

(22) PCT Filed: Apr. 19, 2019

(86) PCT No.: PCT/CN2019/083528
§ 371 (c)(1),
(2) Date: Apr. 23, 2021

(87) PCT Pub. No.: WO2020/211092
PCT Pub. Date: Oct. 22, 2020

(65) Prior Publication Data
US 2022/0033569 A1 Feb. 3, 2022

(30) Foreign Application Priority Data
Apr. 18, 2019 (CN) .......................... 201910311970.6

(51) Int. Cl.
C08G 59/40 (2006.01)
C09D 5/08 (2006.01)
C09D 163/00 (2006.01)

(52) U.S. Cl.
CPC ........... *C08G 59/4064* (2013.01); *C09D 5/08* (2013.01); *C09D 163/00* (2013.01)

(58) Field of Classification Search
None
See application file for complete search history.

(56) References Cited

U.S. PATENT DOCUMENTS

| 460,840 A | 10/1891 | Beam | |
|---|---|---|---|
| 4,165,418 A * | 8/1979 | Speakman | C09D 7/45 525/379 |
| 4,246,148 A | 1/1981 | Shimp et al. | |
| 5,567,748 A * | 10/1996 | Klein | C08G 59/18 523/420 |
| 6,277,928 B1 * | 8/2001 | Stark | C08G 59/184 523/404 |
| 2015/0079402 A1 * | 3/2015 | Tang | C08L 63/00 523/402 |

FOREIGN PATENT DOCUMENTS

| CN | 1084864 A | 4/1994 |
|---|---|---|
| CN | 1292008 A | 4/2001 |
| CN | 103087611 A | 5/2013 |
| CN | 103261317 A | 8/2013 |
| CN | 103788343 A | 5/2014 |
| CN | 105315437 A | 2/2016 |
| CN | 107090077 A | 8/2017 |
| CN | 108003327 A | 5/2018 |
| CN | 108250411 A | 7/2018 |
| CN | 109384907 A | 2/2019 |
| CN | 109467676 A | 3/2019 |
| JP | S63178125 A | 7/1988 |

OTHER PUBLICATIONS

Office Action dated Dec. 10, 2019 in corresponding Chinese Patent Application No. 201910311970.6.
International Search Report issued in PCT/CN2019/083528 dated Jan. 15, 2020.

* cited by examiner

*Primary Examiner* — Megan Mcculley
(74) *Attorney, Agent, or Firm* — Norton Rose Fulbright US LLP; James R. Crawford

(57) ABSTRACT

An ionic aqueous epoxy curing agent, a preparation method therefor and the use thereof. The aqueous epoxy curing agent is prepared by reacting the following raw materials in parts by weight: a) 1 part of a polyepoxy compound, b) 1.3-6 parts of a multifunctional compound, c) 0.2 to 1.25 parts of a monoepoxy compound, and d) 0.01 to 0.23 parts of a sultone, wherein the multifunctional compound has four or more active hydrogens. The curing agent obtained has a good hydrophilic effect and very good thinning performance, the paint film prepared by mixing same with an epoxy dispersion has the following advantages: excellent salt spray resistance and water resistance, strong adhesion, high hardness, etc.; in addition, the preparation process of the curing agent is simple, the conditions are mild, and room temperature curing is carried out.

20 Claims, No Drawings

IONIC AQUEOUS EPOXY CURING AGENT, PREPARATION METHOD THEREFOR AND USE THEREOF

This application is a national phase under 35 U.S.C. § 371 of International Application No. PCT/CN2019/083528 filed on Apr. 19, 2019, which claims the benefit of priority from Chinese Patent Application No. 201910311970.6 filed on Apr. 18, 2019. The entire contents of these applications are incorporated herein by reference in their entirety.

TECHNICAL FIELD

The present disclosure belongs to the technical field of aqueous epoxy coatings and, in particular, relates to an ionic aqueous epoxy curing agent, a preparation method therefor and a use thereof.

BACKGROUND

In recent years, with the rapid development of science and technology, environmental problems have faced severe challenges. The cost of sacrificing the environment is paid more and more attention by the government and people, and the consciousness of environmental protection is gradually strengthened. Among them, coatings and adhesives are some of the products which have a great influence on the environment. In the industry of coatings and adhesives, solvent-based coatings and solvent-based adhesives have been gradually withdrawn from the stage due to the great harm caused by the solvent to the human respiratory system, nervous system, etc., and a storm is being set up in the market from oily products to aqueous products. The trend in epoxy coatings is the same. However, compared to solvent-based coatings, water-based coatings have many performance deficiencies, which limits their popularization and application to some extent. For aqueous epoxy coatings, the problem of insufficient salt spray resistance is a core factor affecting their popularization and application, especially in the field of heavy corrosion protection. Therefore, the improvement of the salt spray resistance has become a research focus of the related art.

Due to the inability of the aqueous epoxy coating itself to establish sufficient strength, its application as single component in the coatings on containers and construction machinery is greatly limited, and thus the introduction of an epoxy curing agent is required. The epoxy curing agent is generally an amine curing agent or a modified amine curing agent. Through the ring-opening reaction between active hydrogens of the epoxy curing agent with epoxy groups of the aqueous epoxy coating, the strength of the paint film is gradually established, thereby meeting the requirements for the resistance and strength of the paint film. In view of the cooperative application of the epoxy curing agent and the aqueous epoxy coating, it is still necessary to further reduce the content of volatile organic compounds (VOC) in the epoxy curing agent so as to achieve the purpose of environmental protection and health.

Currently, the dispersion of the aqueous epoxy curing agent in water is mainly achieved through a non-ionic hydrophilic segment, and the common means is to introduce a polyether chain of ethylene oxide into the curing agent. There are two main types of aqueous epoxy curing agents based on the above method: one is amide modified curing agents, and the other is epoxy-amine addition modified curing agents. There are some examples of these curing agents.

Patent document CN 1292008 A relates to an amide modified curing agent, in which a curing agent modifies polyethylene glycol or poly(ethylene glycol-co-propylene glycol) to obtain a carboxyl-terminated polymer, and then is subjected to amidation with a polyamine to obtain a polyether-modified amide modified curing agent. The curing agent obtained by the above preparation method is in the form of an aqueous dispersion, which has a large structural difference from the epoxy resin so that there are some problems in the compatibility between the curing agent and the epoxy resin. Meanwhile, the oxidation process and the synthesis of the carboxyl-terminated polyethylene glycol are cumbersome, so such a curing agent is industrially unsuitable.

Patent document CN 103261317 A provides a curing agent modified on the basis of an emulsifier. Since the emulsion and the curing agent are similar in structure, the emulsion and the curing agent are well compatible with each other and have an obvious thickening phenomenon and suitable use window. However, the structure of the synthesis of such a curing agent is complex, a multi-step reaction is required, and the preparation of some of the raw materials therein is cumbersome and has a high requirement for industrial equipment.

In order to achieve the hydrophilicity of the curing agent, Patent document CN 1084864 A proposes the preparation of a polyamide curing agent by reacting an oxidized polyethylene glycol with a polyamine. However, in addition to the high technical difficulty of synthesis, the preparation requires the addition of a catalyst to achieve the curing at room temperature and thus cannot solve the problem of a quick-drying curing agent in the absence of the catalyst.

Patent documents U.S. Pat. No. 4,246,148 and US 460840 disclose the preparation method of an aqueous epoxy curing agent cured at room temperature. Since these two patents involve mostly modified products of the aliphatic polyamine, it means that the hydrophilicity of the product obtained after the aliphatic polyamine and a bisphenol A epoxy resin are subjected to a ring-opening addition is reduced. In order to ensure good dispersibility of such a curing agent in water, it is often necessary to add an organic acid (such as acetic acid) to the curing agent for neutralization to form a salt to enhance hydrophilicity. However, the introduction of an organic acid can cause a metallic coating to produce flash rust, thereby degrading the performance of the coating. Moreover, such a curing agent is susceptible to changes in pH, for example, when it is used with alkaline pigment fillers, such a curing agent tends to be unstable.

In order to improve the hydrophilicity of the curing agent, in Patent document CN 108250411 A, a sulfonate is introduced to modify the polyethylene polyamine to obtain a structure having hydrophilicity. However, since there is no epoxy resin structure in the structure of the curing agent, the compatibility between this curing agent and an emulsion is poor, and as a result, the paint film can only be used in the field of moderate corrosion prevention.

Therefore, the simple preparation of curing agents, room temperature curing, and quick-drying thereof remain the focus of the research. In addition, with the increasing demand for curing agents in the field of corrosion prevention of containers, construction machinery, etc., the salt spray resistance of the paint film prepared from the curing agent in combination with the epoxy dispersion is also critical.

SUMMARY

The object of the present disclosure is to provide an aqueous epoxy curing agent. The aqueous epoxy curing agent has a good hydrophilic effect and great dilution performance so that the paint film prepared by mixing same with an epoxy dispersion obtains the following advantages: excellent salt spray resistance and water resistance, strong adhesion, high hardness, etc.; besides, the preparation process of the curing agent is simple with mild conditions, in which room temperature curing can be carried out.

To achieve the preceding object, the technical solutions of the present disclosure are described below.

In an aspect of the present disclosure, an ionic aqueous epoxy curing agent is provided which is prepared by reacting the following raw materials in parts by weight:

a) 1 part of a polyepoxy compound;

b) 1.3 to 6 parts of a multifunctional compound, for example, 1.4 parts, 2.0 parts, 2.5 parts, 3.0 parts, 3.5 parts, 4.5 parts, 5.0 parts, and 5.5 parts, preferably 1.5 to 4 parts;

c) 0.2 to 1.25 parts of a monoepoxy compound, for example, 0.25 parts, 0.3 parts, 0.5 parts, 0.8 parts, 1.0 parts, and 1.2 parts, preferably 0.4 to 0.9 parts; and d) 0.01 to 0.23 parts of a sultone, for example, 0.015 parts, 0.03 parts, 0.05 parts, 0.08 parts, 0.12 parts, 0.15 parts, and 0.2 parts, preferably 0.02 to 0.1 parts;

wherein the multifunctional compound has four or more active hydrogens.

In the present disclosure, the active hydrogen-containing functional group may be a hydroxyl group (phenolic hydroxyl group or alcoholic hydroxyl group), an amino group (—$NH_2$ or —NH—), a carboxyl group, or the like. Preferably, the multifunctional compound is a polyamine compound.

In the present disclosure, the amounts of each of the reaction raw materials of the aqueous epoxy curing agent are based on that the amount of the polyepoxy compound is 1 part by weight.

According to the aqueous epoxy curing agent provided by the present disclosure, the polyamine compound may be selected, for example, from primary amines having four or more active hydrogens. In some examples, the polyamine compound is selected from one or more of aliphatic polyamines (such as aliphatic diamines and aliphatic triamines), cycloaliphatic polyamines (such as cycloaliphatic diamines and cycloaliphatic triamines), and aromatic polyamines (such as aromatic diamines and aromatic triamines), whose molar mass does not exceed 1000 g/mol, preferably one or more of ethylenediamine, propylenediamine, butanediamine, 2-methyl-1,5-pentanediamine, 1,6-hexanediamine, diethylenetriamine, m-xylylenediamine, 1,3-bisaminomethylcyclohexane, 1-ethyl-1,3-propylenediamine, p-aminodicyclohexylmethane (PAMC), 2,2,4-trimethyl-1,6-hexanediamine, p-xylylenediamine, polyetheramine, triethylenetetramine, tetraethylenepentamine, isophorondiamine, polyethylenimine, and diethyltoluenediamine. In some preferred embodiments, the polyamine compound is selected from one or more of m-xylylenediamine, diethylenetriamine, polyetheramine, isophorondiamine, and triethylenetetramine; wherein the polyetheramine is a bisamine polyetheramine with a molar mass of 200 g/mol to 1000 g/mol.

In the present disclosure, the polyepoxy compound refers to a compound having two or more epoxy groups. In some examples, the polyepoxy compound is an aliphatic epoxy resin and/or an aromatic epoxy resin, preferably glycidyl ethers of polyphenols and/or glycidyl ethers of polyols, and the epoxide equivalent of the polyepoxy compound is 150 g/mol to 4000 g/mol, preferably 200 g/mol to 2000 g/mol. In the preparation process of the glycidyl ethers of polyphenols, the raw material of polyphenols which may be used are, for example, resorcinol, hydroquinone, 2,2-bis(4'-hydroxyphenyl)-propane(bisphenol A), dihydroxydiphenylmethane(bisphenol F) and mixtures of isomers thereof, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, bis(4'-hydroxyphenyl)-1,1-ethane, bis(4'-hydroxyphenyl)-1,1-isobutane, bis(4'-hydroxy-t-butylphenyl)-2,2-propane, bis(2-hydroxynaphthyl)-methane, 1,5-dihydroxynaphthalene, tris(4'-hydroxyphenyl)-methane, bis(4-hydroxyphenyl)ether, bis(4-hydroxyphenyl)sulfone, and chlorinated or brominated products of the foregoing compounds. The glycidyl ethers of polyols may include ethanediol-1,2-diglycidyl ether, propandiol-1,2-diglycidyl ether, propandiol-1,3-diglycidyl ether, butanediol diglycidyl ether, pentanediol diglycidyl ether, neopentyl glycol diglycidyl ether, hexanediol diglycidyl ether, diglycol diglycidyl ether, dipropylene glycol diglycidyl ether, higher carbon polyoxyalkylene ethylene glycol diglycidyl ether (such as higher carbon polyoxyethylene glycol diglycidyl ether and polyoxypropylene glycol diglycidyl ether, and mixed polyoxyethylene-propylene glycol diglycidyl ether), polyoxybutylene glycol diglycidyl ether, polyglycidyl ethers of glycerol, polyglycidyl ethers of trimethylolpropane, polyglycidyl ethers of trimethylolethane, polyglycidyl ethers of pentaerythritol, polyglycidyl ethers of sorbitol, polyglycidyl ethers of cyclohexanedimethanol, polyglycidyl ethers of bis(4-hydroxycyclohexyl)methane, diglycidyl ethers of 2,2-bis(4-hydroxycyclohexyl)propane, polyglycidyl ethers of castor oil, or polyglycidyl ethers of triglycidyl tris(2-hydroxyethyl)isocyanurate. In addition, polyglycidyl esters of polycarboxylic acids may also be used, which are prepared by reacting epichlorohydrin or similar epoxy compounds with polycarboxylic acids (such as oxalic acid, succinic acid, adipic acid, glutaric acid, phthalic acid, terephthalic acid, tetrahydrophthalic acid, hexahydrophthalic acid, and 2,6-naphthalenedicarboxylic acid), such as diglycidyl esters of adipic acid, diglycidyl esters of phthalic acid, or diglycidyl esters of hexahydrophthalic acid. The molecular weight of the polyepoxy compound used in the present disclosure may be less than or equal to 1000 Daltons. In some preferred embodiments, the polyepoxy compound is selected from one or more of a bisphenol-A epoxy resin, ethylene glycol diglycidyl ether, diethylene glycol diglycidyl ether, and polyethylene glycol diglycidyl ether. For example, the polyepoxy compound may be epoxy resin E51 or epoxy resin E44.

In the present disclosure, the monoepoxy compound may be an aliphatic compound, a cycloaliphatic compound, or an aromatic compound attached to an epoxy functional group. The monoepoxy compound can allow the hydrogen on the primary amine in the reaction system to react, reducing the opportunity for atmospheric humidity to react with the hydrogen on the primary amine to form carbamates (which, in particular, is represented as the whitening of the coatings and molecular chain scission). The addition of the monoepoxy compound can alleviate the whitening phenomenon by reacting to consume some or all of the hydrogens on the primary amine located at the terminal of the curing agent structure, and can also leave one active hydrogen reactive to the epoxy group after the polyamine is reacted with the epoxy functional group. Therefore, as an end-capping agent, the monoepoxy compound can still leave a secondary-amine hydrogen which is more reactive to the epoxy resin after the primary-amine hydrogen on the polyamine compound is reacted with the epoxy functional group. The end-capping agent achieves both two advantages, i.e., sufficient reactive activity is maintained at room temperature in the absence of a catalyst to cure the system, and the whitening phenomenon can be alleviated. In some examples, the monoepoxy compound is selected from one or more of epoxy ethers of phenols, epoxy esters of unsaturated alcohols, epoxy esters of unsaturated carboxylic acids, aliphatic glycidyl ethers, and aromatic glycidyl ethers, preferably one or more of epoxy ethers of phenols, C1 to C18 aliphatic glycidyl ethers, and C10 to C18 aromatic glycidyl ethers. The epoxy ethers of phenols herein are, for example, epoxy ethers of phenols, epoxy ethers of cresols, epoxy ethers of C1 to C21 alkyl-substituted phenols, epoxy ethers of C7 to C21 aralkyl-substituted phenols, epoxy ethers of C7 to C21 alkaryl-substituted phenols, cardanol glycidyl ether, and epoxy ethers of alkoxy-substituted phenols. The epoxy esters of unsaturated carboxylic acids herein are, for example, glycidyl esters of monocarboxylic acids (such as glycidyl esters of octanoic acid, glycidyl esters of decanoic acid, glycidyl esters of lauric acid, glycidyl esters of stearic acid, and glycidyl esters of arachidic acid), glycidyl esters of neocapric acid, epoxidized methyl oleate, epoxidized n-butyl oleate, epoxidized methyl palmitoleate, and epoxidized ethyl linoleate. The C10 to C18 aromatic glycidyl ethers herein are, for example, phenyl glycidyl ether, cresyl glycidyl ether, and benzyl glycidyl ether. The C1 to C18 aliphatic glycidyl ethers herein are, for example, butyl glycidyl ether, C12 to C14 alkyl-chain glycidyl ethers, t-butyl glycidyl ether, cyclohexyl glycidyl ether, allyl glycidyl ether, octyl glycidyl ether, isopropyl glycidyl ether, decyl glycidyl ether, and p-tert-butylphenyl glycidyl ether. In some examples, the monoepoxy compound is selected from one or more of cardanol glycidyl ether, butyl glycidyl ether, C12 to C14 alkyl glycidyl ethers, cresyl glycidyl ether, phenyl glycidyl ether, nonylphenylglycidyl ether, and p-tert-butylphenyl glycidyl ether. In some preferred embodiments, the monoepoxy compound is selected from one or more of butyl glycidyl ether, C12 to C14 alkyl glycidyl ethers, cresyl glycidyl ether, phenyl glycidyl ether, nonylphenylglycidyl ether, and p-tert-butylphenyl glycidyl ether.

In the present disclosure, the sultone refers to a class of compounds that can produce compounds having sulfonic acid groups or sulfonate groups after subjected to a ring-opening reaction. In addition to the monoepoxy compound, the sultone can be used as another end-capping agent. In some examples, the sultone is an unsaturated sultone and/or a saturated sultone. In some preferred embodiments, the sultone is selected from propanesultone and/or butanesultone.

According to the aqueous epoxy curing agent provided by the present disclosure, in some examples, the reaction raw materials of the aqueous epoxy curing agent further include: e) 0 to 0.075 parts (for example, 0.005 parts, 0.009 parts, 0.01 parts, 0.015 parts, 0.018 parts, 0.02 parts, 0.03 parts, and 0.05 parts) of an alkaline-neutralizing agent, preferably 0.003 to 0.05 parts; f) 0.4 to 2 parts (for example, 0.5 parts, 1 part, and 1.5 parts) of water, preferably 0.7 to 1.5 parts; and g) 0 to 0.5 parts (for example, 0.05 parts, 0.09 parts, 0.1 parts, 0.15 parts, 0.2 parts, and 0.3 parts) of an unmodified polyetheramine, preferably 0.09 to 0.2 parts. The parts used herein for representing the amount of each of the above reaction raw materials are parts by weight.

In some examples, the alkaline-neutralizing agent is selected from one or more of sodium hydroxide, potassium hydroxide, trimethylamine, and diethylamine.

In some examples, the unmodified polyetheramine is a polyetheramine with a molar mass of 200 g/mol to 5000 g/mol, whose functionality is preferably 2 or 3. For example, the unmodified polyetheramine is polyetheramine D230, polyetheramine D400, polyetheramine T403, or polyetheramine T5000. After the unmodified polyetheramine is added to the reaction system, the small shrinkage pores appearing on the appearance of the obtained paint film prepared using the obtained curing agent can be adjusted.

In the present disclosure, the aqueous epoxy curing agent includes compounds having sulfonic acid groups or sulfonate groups and also includes compounds having neither sulfonic acid group nor sulfonate group. According to the aqueous epoxy curing agent provided by the present disclosure, the introduction of the sultone as a reaction raw material enables the aqueous epoxy curing agent to include compounds having sulfonic acid or sulfonate groups. In the curing agent obtained in the present disclosure, the compounds having sulfonic acid or sulfonate groups have the effect of enhancing the hydrophilicity of the curing agent, and thus the curing agent including sulfonic acid or sulfonate groups can achieve the effects that the emulsifier can achieve, that is, with the good dispersion of the curing agent in water, the amount of the solvent used when the curing agent is diluted can be reduced, thereby reducing the VOC content in the system (for example, the VOC content can be reduced from 184 g/L to 113 g/L).

When the curing agent includes no or few compounds having sulfonic acid or sulfonate groups, the dilution performance of the curing agent will be affected so that the VOC in the system cannot be effectively reduced. When the content of the compounds having sulfonic acid or sulfonate groups in the curing agent is too high, the hydrophilicity of the curing agent will be too strong, thereby affecting the salt spray resistance of the paint film obtained using the curing agent and causing a large amount of flash rust. In some examples, the compound having sulfonic acid or sulfonate groups constitutes 2 wt % to 7 wt %, for example, 2.5 wt %, 3 wt %, 3.5 wt %, 4 wt %, 4.5 wt %, 5 wt %, 6 wt %, and 6.5 wt %, preferably 2.5 wt % to 6 wt %, of the total weight of the aqueous epoxy curing agent.

In another aspect of the present disclosure, a preparation method for the aqueous epoxy curing agent described above is provided. The preparation method includes the following steps: subjecting the polyepoxy compound to a ring-opening reaction with the multifunctional compound to obtain an intermediate product i, and subjecting the intermediate product i to an end-capping reaction with the monoepoxy compound and the sultone to obtain the aqueous epoxy curing agent.

According to the preparation method provided by the present disclosure, in some examples, in the ring-opening reaction, the polyepoxy compound is added dropwise to the multifunctional compound, wherein the reaction duration of the ring-opening reaction is 0.5 hours to 4 hours (for example, 1 hour, 2 hours, and 3 hours), preferably 1 hour to 2.5 hours, and the reaction temperature of the ring-opening reaction is 60° C. to 100° C. (for example, 70° C., 75° C., 85° C., and 90° C.), preferably 80° C. to 100° C.

In some examples, the reaction raw materials of the aqueous epoxy curing agent further include 0.4 to 2 parts of water, preferably 0.7 parts to 1.5 parts; and in the end-capping reaction, water is added for dispersion and viscosity reduction, then the monoepoxy compound is added dropwise to the reaction system, and finally, the sultone is added and reacted for 10 minutes to 30 minutes. The step in which water is added to the reaction system for dispersion and viscosity reduction can adjust the curing agent to have proper solid content. The reaction duration for adding the monoepoxy compound is 0.5 hours to 2 hours (for example, 0.8 hours, 1.2 hours, and 1.5 hours), preferably 1 hour to 2 hours, and the reaction temperature of the end-capping reaction is 60° C. to 100° C. (for example, 70° C., 75° C., 85° C., and 90° C.), preferably 80° C. to 100° C.

It is to be particularly noted that the manner of adding the polyepoxy compound and the monoepoxy compound in the preparation method is dropwise addition, and in this way, the reaction exotherm can be controlled by controlling the acceleration of dropwise addition, thereby effectively controlling the progress of the reaction. In addition, the addition sequence of water (such as deionized water) for the purpose of dispersion and viscosity reduction and the monoepoxy compound to the reaction system can greatly affect the use performances (such as salt spray resistance) of the curing agent.

After the completion of the ring-opening reaction of the polyepoxy compound with the multifunctional compound, the intermediate product i is produced; and in the end-capping reaction, a part of the intermediate product i is reacted with the monoepoxy compound, and the remaining part of the intermediate product i is reacted with the sultone. A compound containing sulfonic acid groups is obtained by the ring-opening reaction of the sultone with active hydrogens in the reaction system, and in this case, the pH of the resulting curing agent in the system is basic and can be self-neutralized or neutralized by adding an alkaline-neutralizing agent. In the present disclosure, the alkaline-neutralizing agent may be, but is not necessarily, added, and the operation of self-neutralization without adding a neutralizing agent enables the process to be relatively simple. In contrast, with the same amount of sultone added, the resulting curing agent has better water dispersibility and lower VOC content in the system after neutralization by adding the alkaline-neutralizing agent. The molar amount of the added alkaline-neutralizing agent needs to be equivalent to the mole number of corresponding sulfonic acid groups, that is, to achieve 100% neutralization. According to the preparation method provided by the present disclosure, in some examples, the preparation method further includes: after the competition of the ring-opening reaction, subjecting the reaction system to reduced pressure distillation to remove excess multifunctional compound (for example, polyamine compound, which is produced due to the excess of the multifunctional compound in the ring-opening reaction of the polyepoxy compound with the multifunctional compound) in the reaction system.

In some examples, the reaction raw materials of the aqueous epoxy curing agent further include 0 to 0.075 parts of an alkaline-neutralizing agent, preferably 0.003 parts to 0.05 parts, and 0 to 0.5 parts of an unmodified polyetheramine, preferably 0.09 parts to 0.2 parts, and after the competition of the end-capping reaction, the alkaline-neutralizing agent is added to perform a neutralization reaction, or the alkaline-neutralizing agent and the unmodified polyetheramine are added. In the present disclosure, the unmodified polyetheramine may be, but is not necessarily, added, and the addition of the unmodified polyetheramine can adjust the small shrinkage pores on the paint film in the curing system.

In some specific embodiments, the preparation method is as follows: adding an excess of the polyamine compound to the reaction flask in advance, and adding the polyepoxy compound to the reaction flask dropwise, wherein the time of the dropwise addition is controlled to be 0.5 hours to 4 hours, preferably to be 1 hour to 2.5 hours, and the reaction temperature is 60° C. to 100° C.; after the completion of the dropwise addition, obtaining the intermediate product i, removing excess polyamine compound by reduced pressure distillation, then further adding deionized water to disperse and reduce viscosity, and adding the monoepoxy compound dropwise, wherein the time of the dropwise addition is controlled to be 0.5 hours to 2 hours, preferably to be 1 hour to 2 hours, and the reaction temperature is 60° C. to 100° C.; and adding the sultone (such as propanesultone and/or butanesultone) in a ratio as previously described and reacting for 10 minutes to 30 minutes, adding (but not necessarily) an alkaline-neutralizing agent, and adding (but not necessarily) unmodified polyetheramine to adjust the performances of the curing agent.

According to the preparation method provided by the present disclosure, other non-ideal structures may be produced in the obtained aqueous epoxy curing agent product, but since the preparation process does not involve a separation of by-products, the product will be used as a whole, and all effect evaluation is carried out on the whole product. The reaction process is monitored by a near-infrared method and a nuclear magnetic method. The disappearance of the epoxy groups proves the completion of the reaction, and the performance indicators of the finally-obtained aqueous epoxy curing agent system include amine value test, solid content, and pH value. In some examples, the amine value of the aqueous epoxy curing agent is 100 mgKOH/g to 500 mgKOH/g, preferably, 150 mgKOH/g to 350 mgKOH/g.

In some examples, the pH value of the aqueous epoxy curing agent is 8 to 11.5, preferably 9 to 11.

In some examples, the solid content of the aqueous epoxy curing agent is 60 wt % to 80 wt %, for example, 65 wt %, 70 wt %, 75 wt %, and 78 wt %.

In some examples, the aqueous epoxy curing agent further includes a compound having sulfonic acid or sulfonate groups, which constitutes 2 wt % to 7 wt %, preferably 2.5 wt % to 6 wt %, of the total weight of the aqueous epoxy curing agent. In the present disclosure, the intermediate product i is subjected to an end-capping reaction with the monoepoxy compound and the sultone. A part of the intermediate product i is reacted with the sultone to prepare the compound having sulfonic acid groups or sulfonate groups. The structure including ionic groups provides a feasible scheme for the dissolution and dispersion of the curing agent in water, and the introduction of sulfonic acid or sulfonate groups enables the dissolution and dispersion of the curing agent in water to be efficient and fast so that with only a small amount of ionic groups introduced into the curing agent, the dilution effect of the curing agent in water can be well achieved, thereby improving the construction performance of the curing agent in the art.

According to another aspect of the present disclosure, a use of the aqueous epoxy curing agent described above or an aqueous epoxy curing agent prepared by the preparation method described above in the formulation of coatings and the curing of an epoxy resin system is provided.

The aqueous epoxy curing agent obtained according to the present disclosure can be used for curing liquid or solid epoxy resins in organic solvents or in water, and any of the epoxy resins mentioned above in the preparation of the aqueous epoxy curing agent described in the present disclosure can be cured by the aqueous epoxy curing agent. The aqueous epoxy curing agent according to the present disclosure can be used in the coating of room-temperature coatings and baking coatings, and the curing temperature thereof can be selected according to different coating manners and is generally in the range of 5° C. to 200° C.

Furthermore, the aqueous epoxy curing agent obtained according to the present disclosure can be dispersed or dissolved in water, and can mix water in the aqueous epoxy curing agent in the presence or absence of a surfactant to obtain a composition. However, since the curing agent obtained according to the present disclosure is self-emulsifiable, an aqueous solution, emulsion or dispersion of the curing agent can be obtained without adding any surfactant.

The aqueous epoxy curing agent obtained according to the present disclosure can be used for effectively curing an aqueous epoxy resin system. A preferred example of the aqueous epoxy resin is an aqueous bisphenol A epoxy resin that has a molecular weight of 350 to 5000 and that is dispersed in a nonionic form or a nonionic and ionic complex in the presence or absence of glycol ether co-solvent. The commercial products of the aqueous epoxy resin include, for example, EPIREZ resins 3520, 3522, and 3540 available from Shell Chemicals UK Limited. These curable systems include water, one or more epoxy resins, and one or more of the aqueous epoxy curing agents obtained according to the present disclosure. These aqueous curable epoxy resin systems can be cured at room temperature or elevated temperatures, or can further be cured at lower curing temperatures under the catalysis of commercial tertiary amine accelerators (for example, 2,4,6-tris(dimethylaminomethylphenol) (DMP-30)) or phenols. These lower curing temperatures are generally at 5° C. to 20° C. The aqueous epoxy curing agent obtained according to the present disclosure can also be typically used for formulating thermosetting coatings having good corrosion protection effects on coated substrates.

The aqueous epoxy curing agent obtained according to the present disclosure can, but is not limited to, be applied to the curing in the fields of epoxy coatings and adhesives, and can also be used as a component of adhesives and fiber sizing agents.

Auxiliaries may be, but is not necessarily, added in the system in which the curing agent according to the present disclosure is prepared, and may also be, but is not necessarily, added in the curing system in which the curing agent is applied. The auxiliaries include, but are not limited to, antifoaming agents, dispersants, thickeners, leveling agents, adhesion promoters, and the like.

Since the epoxy curing agents are viscous when it is used, it needs to be diluted, typically by mixing the curing agent, a solvent, and water in proportions. Due to the good hydrophilicity of the aqueous epoxy curing agent prepared according to the present disclosure, a small amount of solvent can be added in the dilution process, so that the VOC content of the system can be effectively reduced. Meanwhile, when the aqueous epoxy curing agent obtained according to the present disclosure is mixed with a resin matrix, the compatibility therebetween is good, and the paint film obtained by mixing the two has many excellent properties. In addition, auxiliaries may also be added to the paint film to perform an adjustment to obtain desired properties, and unmodified polyetheramine can adjust the appearance of the paint film.

Compared with the related art, the technical solutions of the present disclosure have beneficial effects described below.

The aqueous epoxy curing agent obtained according to the present disclosure has a good hydrophilic effect and great dilution performance so that the paint film prepared by applying the curing agent to an epoxy dispersion obtains the following advantages: excellent salt spray resistance and water resistance, strong adhesion, high hardness (for example, free of shrinkage pores and scratches), etc. In addition, the preparation process of the aqueous epoxy curing agent is simple with mild conditions, and the room temperature curing can be carried out with the use of the curing agent.

DETAILED DESCRIPTION

To provide a clearer understanding of the technical features and contents of the present disclosure, a detailed description of the preferred embodiments of the present disclosure will be given below. The examples illustrate the preferred embodiments of the present disclosure, but it should be understood that the present disclosure may be implemented in various ways and should not be limited to the embodiments set forth herein.

<The Sources of Reaction Raw Materials>

| Material name | Form | Supplier | CAS No. |
|---|---|---|---|
| Isophorondiamine | Liquid | BASF | 2855-13-2 |
| Diethylenetriamine | Liquid | Dow Chemical | 111-40-0 |
| m-xylylenediamine | Liquid | Ningbo Guomao Chemical | 1477-55-0 |
| Epoxy resin E51/E44 | Viscous liquid | Sinopec (Baling) | 25068-38-6 |
| Diethylene glycol diglycidyl ether | Liquid | Anhui Hengyuan Group | 4206-61-5 |
| Butyl glycidyl ether | Liquid | Anhui Hengyuan Group | 2426-08-06 |
| Phenyl glycidyl ether | Liquid | Anhui Hengyuan Group | 122-60-1 |
| Cardanol glycidyl ether | Liquid | Anhui Hengyuan Group | 171263-25-5 |
| Polyetheramine D400/T403/T5000 | Liquid | Huntsman | 9046-10-0, 39423-51-3 |
| Propanesultone | White crystal | TCI | 1120-71-4 |
| Butanesultone | Liquid | Aladdin | 1633-83-6 |
| Sodium hydroxide | Solid | Sinopharm | 1310-73-2 |

<Test Methods>

The pendulum hardness was tested with reference to Determination of hardness of the paint films—Pendulum damping test (GB/T 1730).

The adhesion was tested with reference to Paints and varnishes—Cross cut test for films (GB/T 9286).

The water resistance was tested with reference to Determination of resistance to water of films (GB/T 1733).

The salt spray resistance was tested with reference to Method of producing of paint films for testing heat and humidity resistance, salt fog resistance and accelerated weathering (GB/T 1765).

The 30-day thermal storage stability of curing agents or coatings was tested in the following manner: a sample to be tested was placed in a constant temperature oven at 50° C. and tested for 30 days to see whether there was delamination.

The amine value of the curing agent was tested by titration: a sample to be tested was dissolved in methanol, a solution of di-n-butylamine-chlorobenzene was added thereto, potentiometric titration was carried out with hydrochloric acid standard solution until there was mutation occurring, then blank titration was carried out in the same manner, and the final result was calculated based on the mass of KOH equivalent to the sample, in units of mg KOH/g.

The infrared spectroscopy test was carried out in the following manner: in the process of the reaction for preparing an aqueous epoxy curing agent, a sample which was taken from the reaction system was used as the sample to be tested, the sample to be tested was then measured with a Fourier infrared spectrometer until the peak at a wavenumber of 913 cm$^{-1}$ disappeared, and after that, the reaction was considered to be completed.

The nuclear magnetic test was carried out in the following manner: in the process of the reaction for preparing an aqueous epoxy curing agent, a sample which was taken from the reaction system was used as the sample to be tested, the sample to be tested was dissolved with a deuterated reagent and then subjected to hydrogen spectrum analysis by nuclear magnetic, the hydrogen of the epoxy group had an absorption peak at a chemical shift of about 4.3, and after the signal peak at this chemical shift disappeared completely, the reaction was considered to be completed.

In each of the following Examples and Comparative Examples, the reaction endpoint of the preparation process of the curing agent was determined by both infrared spectroscopy and nuclear magnetic method.

Example 1

300 g of isophoronediamine was added into a reaction flask, and the temperature was preheated to 80° C. 160 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 120 g of deionized water was added to the reaction system for dispersion after excess isophoronediamine in the reaction system was removed, and 100 g of butyl glycidyl ether was gradually dripped into the reaction flask by a peristaltic pump for reaction, wherein the addition duration was 1 hour and the temperature was maintained for half an hour. 5 g of propanesultone was added to the reaction system slowly and reacted for 10 minutes, after the reaction, 1.7 g of NaOH was added therein for neutralization, and then 15 g of polyetheramine D400 was added therein. After the material in the reaction flask was stirred evenly, a curing agent was obtained. The resulting curing agent had a solid content of 73.9 wt %, an amine value of 275 mg KOH/g, and a pH of 9.7. The compound having sulfonate groups in the resulting curing agent constituted 3.7 wt % of the total weight of the aqueous epoxy curing agent.

Example 2

280 g of diethylenetriamine was added into a reaction flask, and the temperature was preheated to 80° C. 150 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 95 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 75.2 wt %, an amine value of 325 mg KOH/g, and a pH of 10.1. The compound having sulfonate groups in the resulting curing agent constituted 4.6 wt % of the total weight of the aqueous epoxy curing agent.

Example 3

350 g of diethylenetriamine was added into a reaction flask, and the temperature was preheated to 80° C. 150 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 140 g of deionized water was added to the reaction system for dispersion after excess diethylenetriamine in the reaction system was removed, and 110 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour. After the reaction, the material in the reaction flask was stirred evenly, and a curing agent was obtained. The resulting curing agent had a solid content of 76.2 wt %, an amine value of 295 mg KOH/g, and a pH of 9.2. The compound having sulfonate groups in the resulting curing agent constituted 2.9 wt % of the total weight of the aqueous epoxy curing agent.

Example 4

312 g of triethylenetetramine was added into a reaction flask, and the temperature was preheated to 80° C. 148 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 120 g of deionized water was added to the reaction system for dispersion after excess triethylenetetramine in the reaction system was removed, and 105 g of phenyl glycidyl ether was gradually dripped into the reaction flask by a peristaltic pump for reaction, wherein the addition duration was 1 hour and the temperature was maintained for half an hour. 8 g of propanesultone was added to the reaction system slowly and reacted for half an hour, and after the reaction, 2.6 g of NaOH was added therein for neutralization. After the material in the reaction flask was stirred evenly, a curing agent was obtained. The resulting curing agent had a solid content of 78.2 wt %, an amine value of 329 mg KOH/g, and a pH of 9.6. The compound having sulfonate groups in the resulting curing agent constituted 3.6 wt % of the total weight of the aqueous epoxy curing agent.

Example 5

280 g of diethylenetriamine was added into a reaction flask, and the temperature was preheated to 80° C. 120 g of diethylene glycol diglycidyl ether was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 100 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 74.8 wt %, an amine value of 257 mg KOH/g, and a pH of 10.4. The compound having sulfonate groups in the resulting curing agent constituted 4.1 wt % of the total weight of the aqueous epoxy curing agent.

Example 6

280 g of diethylenetriamine was added into a reaction flask, and the temperature was preheated to 80° C. 150 g of a mixture of epoxy resin E51 and diethylene glycol diglycidyl ether was gradually dripped into the reaction flask by a peristaltic pump, and then a ring-opening reaction was carried out, wherein the addition duration continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 95 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 75.6 wt %, an amine value of 280 mg KOH/g, and a pH of 9.4. The compound having sulfonate groups in the resulting curing agent constituted 5.2 wt % of the total weight of the aqueous epoxy curing agent.

Example 7

320 g of m-xylylenediamine was added into a reaction flask, and the temperature was preheated to 80° C. 150 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 120 g of deionized water was added to the reaction system for dispersion after excess m-xylylenediamine in the reaction system was removed, and 95 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 77.2 wt %, an amine value of 253 mg KOH/g, and a pH of 9.0. The compound having sulfonate groups in the resulting curing agent constituted 2.6 wt % of the total weight of the aqueous epoxy curing agent.

Example 8

300 g of triethylenetetramine was added into a reaction flask, and the temperature was preheated to 80° C. 120 g of diethylene glycol diglycidyl ether was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess triethylenetetramine in the reaction system was removed, and 115 g of cardanol glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 74.1 wt %, an amine value of 307 mg KOH/g, and a pH of 9.5. The compound having sulfonate groups in the resulting curing agent constituted 2.8 wt % of the total weight of the aqueous epoxy curing agent.

Example 9

280 g of diethylenetriamine was added into a reaction flask, and the temperature was preheated to 80° C. 120 g of diethylene glycol diglycidyl ether was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 75 g of butyl glycidyl ether was gradually dripped into the reaction flask by a peristaltic pump for reaction, wherein the addition duration was 1 hour and the temperature was maintained for half an hour. 10 g of propanesultone was added to the reaction system slowly and reacted for half an hour. After the reaction, the material in the reaction flask was stirred evenly, a curing agent was obtained. The resulting curing agent had a solid content of 73.8 wt %, an amine value of 265 mg KOH/g, and a pH of 9.2. The compound having sulfonate groups in the resulting curing agent constituted 6.2 wt % of the total weight of the aqueous epoxy curing agent.

Example 10

400 g of diethylenetriamine was added into a reaction flask, and the temperature was preheated to 80° C. 150 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 95 g of phenyl glycidyl ether was gradually dripped into the reaction flask by a peristaltic pump for reaction, wherein the addition duration was 1 hour and the temperature was maintained for half an hour. 6 g of propanesultone was added to the reaction system slowly and reacted for half an hour, after the reaction, 2 g of NaOH was added therein for neutralization, and then 20 g of polyetheramine T403 was added therein. After the material in the reaction flask was stirred evenly, a curing agent was obtained. The resulting curing agent had a solid content of 75.2 wt %, an amine value of 365 mg KOH/g, and a pH of 9.6. The compound having sulfonate groups in the resulting curing agent constituted 2.9 wt % of the total weight of the aqueous epoxy curing agent.

Example 11

280 g of diethylenetriamine was added into a reaction flask, and the temperature was preheated to 80° C. 170 g of epoxy resin E44 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, 130 g of deionized water was added to the reaction system for dispersion after excess diethylenetriamine in the reaction system was removed, and 110 g of cardanol glycidyl ether was gradually dripped into the reaction flask by a peristaltic pump for reaction, wherein the addition duration was 1 hour and the temperature was maintained for half an hour. 8 g of butanesultone was added to the reaction system slowly and reacted for half an hour, and after the reaction, 2.5 g of NaOH was added therein for neutralization. After the material in the reaction flask was stirred evenly, a curing agent was obtained. The resulting curing agent had a solid content of 74.7 wt %, an amine value of 271 mg KOH/g, and a pH of 9.6. The compound having sulfonate groups in the resulting curing agent constituted 6.6 wt % of the total weight of the aqueous epoxy curing agent.

Comparative Example 1

Step 1: a solution of 187 g of toluene and 187 g of epoxy resin (Yueyang Baling Sinopec E51) was added to an excess amount of m-xylylenediamine at 100° C., the mixture was maintained at 100° C. and reacted for 5 hours, and then excess toluene was removed by reduced pressure distillation and excess m-xylylenediamine was recovered.

Step 2: 229.5 g of the product obtained in Step 1 was reacted with 50 g of methoxy PEG acetic acid at 200° C. for 4 hours under a nitrogen atmosphere and then cooled to 100° C., 220.5 g of phenyl glycidyl ether was added at 140° C., the temperature was maintained at 100° C. for two hours after the addition, and a curing agent was prepared.

Step 3: 400 g of the curing agent prepared in Step 2 and 44.4 g of toluene were added to a glass bottle and stirred, 111 g of water was then added to the glass bottle, and after the addition, an oil-in-water emulsion was formed. 26.2 g of toluene and 187 g of water were added to form an emulsion of the curing agent having a solid content of 49.7 wt %. The resulting curing agent had an amine value of 176 mg KOH/g and a pH of 9.6.

Comparative Example 2

Step 1: 30 g of epoxy resin E51, 200 g of polyether (PEG4000), and 20 g of acetone were added into a reaction flask, and with the temperature heated to 60° C., mixed evenly and refluxed. 4.76 wt % of a catalyst solution consisting of 1 g of boron trifluoride ethyl ether and 20 g of acetone was added dropwise for half an hour. After the completion of the addition, the reaction was continued at this temperature for 1 hour. After the product was dissolved in water, 15 g of deionized water was added to terminate the reaction to obtain a condensate.

Step 2: 38.8 g epoxy resin E51 and 25 g of diethylenetriamine were weighted, epoxy resin E51 was added once for all to a mixture of diethylenetriamine and 25 g of acetone at normal temperature, heated with stirring, and reacted at 60° C. for half an hour to obtain a polyamine adduct. The condensate obtained in Step 1 and the polyamine adduct were mixed at a mass ratio of 3.6:1 and then stirred for 3 hours to obtain a modified polyamine compound. After acetone was removed by reduced pressure distillation, deionized water was added dropwise to adjust the solid content to 50.2 wt % to obtain a non-ionic curing agent. The resulting curing agent had an amine value of 109 mg KOH/g and a pH of 9.1.

Comparative Example 3

280 g of diethylenetriamine was added to a reaction flask, and the temperature was preheated to 80° C. 150 g of epoxy resin E51 was gradually dripped into the reaction flask by a peristaltic pump, and then a ring-opening reaction was carried out, wherein the addition continued for 1 hour and the temperature continued to be maintained for half an hour. After the completion of the ring-opening reaction, the material in the reaction flask was distilled under reduced pressure by a vacuum pump, and 95 g of phenyl glycidyl ether was gradually dripped into the reaction flask by a peristaltic pump after excess diethylenetriamine in the reaction system was removed, wherein the addition duration was 1 hour and the temperature was maintained for half an hour. After that, 120 g of deionized water was added to the reaction system for dispersion, 6 g of propanesultone was added to the reaction system slowly and reacted for half an hour, and after the reaction, 2 g of NaOH was added therein for neutralization. After the material in the reaction flask was stirred evenly, a curing agent was obtained. The resulting curing agent had a solid content of 75.9 wt %, an amine value of 299 mg KOH/g, and a pH of 9.8. The compound having sulfonate groups in the resulting curing agent constituted 3.1 wt % of the total weight of the aqueous epoxy curing agent.

Each of the aqueous epoxy curing agents obtained in the Examples and Comparative Examples was mixed with an aqueous epoxy emulsion to prepare a paint film, wherein the formulations of Component A and Component B for preparing the paint film were shown in Table 1 and Table 2.

TABLE 1

Formulation of Component A

| Composition | Supplier | Mass fraction (wt %) |
|---|---|---|
| $H_2O$ | — | 12 |
| Dispersant ADDITOL VXW 6208 | BYK | 2 |
| pH adjuster AMP-95 | Angus Chemical | 0.2 |
| Barium sulfate | Linke Chemical | 13 |
| Zinc phosphate | Xinjing Chemical | 9 |
| Wollastonite | Mineral product from Shanggao Yueliang Mountain | 25 |
| Black carbon | Evonik | 0.8 |
| Epoxy emulsion 6520 | Hexion | 36 |
| Wetting agent BYK346 | BYK | 0.5 |
| Foamstar 2410 | BASF | 0.5 |
| Flash rust inhibitor FA179 | Elementis | 0.2 |
| Thickener U905 | Wanhua | 0.8 |
| Total | | 100 |

TABLE 2

Formulation of Component B

| Composition | Supplier | Mass fraction (wt %) |
|---|---|---|
| $H_2O$ | | 30 |
| DPnB | Dow Chemical | 30 |
| Curing agent | Curing agents prepared in Examples 1 to 11 and Curing agents prepared in Comparative Examples 1 to 3 | 40 |
| Total | | 100 |

The main paint (component A) obtained in Table 1 and each of the curing agents (component B) obtained in Table 2 were mixed according to a mass ratio of 10:1 and stirred for 15 minutes, and after that, a small amount of deionized water was added to adjust the mixture to a construction viscosity to obtain a mixed paint solution. The mixed paint was then plastered according to industry operating standards (flash leveling for 10 minutes and baking at 80° C. for 30 minutes) to obtain a paint film. The paint film was allowed to stand for 7 days under standard conditions of 23±2° C. and a humidity of 50±5%, and after that, each test was carried out according to the test method described above.

The resulting paint films were tested according to the test methods described above and the performance test results are shown in Table 3.

TABLE 3

Test results of thermal stability of Curing agents and paint performance

| Examples of curing agents | 30-day thermal storage stability of curing agents | adhesion | water resistance | salt spray resistance | Activation period (h) | pendulum hardness (s) | VOC content (deducting water) of pain system (g/L) |
|---|---|---|---|---|---|---|---|
| Example 1 | Transparent and unlayered | 0 | 5 | 5 | 4 | 82 | 105 |
| Example 2 | Transparent and unlayered | 0 | 5 | 5− | 4.5 | 77 | 105 |
| Example 3 | Transparent and unlayered | 0 | 5 | 5 | 4 | 73 | 105 |
| Example 4 | Transparent and unlayered | 0 | 5 | 4+ | 5 | 81 | 105 |
| Example 5 | Transparent and unlayered | 0 | 5 | 5 | 5 | 78 | 105 |
| Example 6 | Transparent and unlayered | 0 | 5 | 5 | 4.5 | 69 | 105 |
| Example 7 | Transparent and unlayered | 0 | 5 | 5 | 4 | 78 | 105 |
| Example 8 | Transparent and unlayered | 0 | 5 | 5− | 4 | 80 | 105 |
| Example 9 | Transparent and unlayered | 0 | 5 | 5 | 5 | 84 | 105 |
| Example 10 | Transparent and unlayered | 0 | 5 | 5 | 5 | 76 | 105 |
| Example 11 | Transparent and unlayered | 0 | 5 | 5 | 4 | 69 | 105 |
| Comparative Example 1 | non-transparent | 2 | 4+ | 2 | 6.5 | 61 | 269 |
| Comparative Example 2 | Solid precipitation | 3 | 3 | 1+ | 3.5 | 55 | 197 |
| Comparative Example 3 | Transparent and layered | 2 | 4 | 2 | 4 | 63 | 178 |

Each test was carried out in accordance with the national standards, as described specifically in <Test methods>. The endurance data were test results after 20 days of tracking observation.

The grade of the adhesion test results is 0 to 5, wherein grade 0 means that the adhesion is the best and grade 5 means that the adhesion is the worst.

The grade of the water-resistance test results is 0 to 5, wherein grade 5 means that the water resistance is the best and grade 0 means that the water resistance is the worst.

The grade of the salt spray resistance test results is 0 to 5, wherein grade 5 means that the salt spray resistance is the best and grade 0 means that the salt spray resistance is the worst.

From the results of Table 1, it can be seen that the thermal storage stability of the curing agents obtained in Examples 1 to 11 was good, and no delamination occurred, which indicates that the introduction of ionic groups (sulfonic acid groups or sulfonate groups) had positive effects on the stability of the curing agent system. When the curing agent was too hydrophilic, the water resistance performance of the obtained paint film became weak, and therefore, the hydrophilicity of the curing agent and the water resistance of the obtained paint film needed to be balanced. In the present disclosure, hydrophilicity was improved by introducing a certain proportion of compounds having sulfonic acid groups or sulfonate groups into the curing agent. When the curing agent was used in the curing system, the performance indicators of the paint films in each test were great, that is, after the aqueous epoxy curing agents prepared in each Example were applied to the paint film prepared from a dispersion, data such as adhesion, water resistance, salt spray resistance, activation period, and paint film hardness were excellent. However, in Comparative Examples 1 to 2, no ionic group was introduced into the curing agent, and after 30 days, the thermal storage stability of these curing agents was poor, and the hydrophilicity of the prepared curing agents was not superior to that of the curing agents prepared in each Example of the present disclosure. The addition sequence of water (for the purpose of viscosity reduction) and the monoepoxy compound in Comparative Example 3 was opposite to the sequence in Example 2, which seriously affected the salt spray resistance of the curing agent. Meanwhile, the synthesis conditions of the aqueous epoxy curing agents prepared in each Example were mild, the preparation steps were simple, and thus these aqueous epoxy curing agents could meet the market requirements and be particularly suitable for applying in the field of heavy corrosion protection.

The above have described various embodiments of the present disclosure. The above description is illustrative, and not exhaustive, and not limited to the disclosed various embodiments. Without departing from the scope and spirit of the described various embodiments, various modifications and variations are apparent to those skilled in the art.

What is claimed:

1. An ionic aqueous epoxy curing agent, prepared by reacting the following raw materials in parts by weight:
    a) 1 part of a polyepoxy compound;
    b) 1.3 to 6 parts of a multifunctional compound;
    c) 0.2 to 1.25 parts of a monoepoxy compound; and
    d) 0.01 to 0.23 parts of a sultone;
    wherein the multifunctional compound has four or more active hydrogens.

2. The aqueous epoxy curing agent according to claim 1, wherein the multifunctional compound is a polyamine compound;
    the polyamine compound is selected from one or more of aliphatic polyamines, cycloaliphatic polyamines, and aromatic polyamines, whose molar mass does not exceed 1000 g/mol.

3. The aqueous epoxy curing agent according to claim 1, wherein the polyepoxy compound is an aliphatic epoxy resin and/or an aromatic epoxy resin; the epoxide equivalent of the polyepoxy compound is 150 g/mol to 4000 g/mol.

4. The aqueous epoxy curing agent according to claim 1, wherein the monoepoxy compound is selected from one or more of epoxy ethers of phenols, epoxy esters of unsaturated alcohols, epoxy esters of unsaturated carboxylic acids, aliphatic glycidyl ethers, and aromatic glycidyl ethers.

5. The aqueous epoxy curing agent according to claim 1, wherein the sultone is an unsaturated sultone and/or a saturated sultone.

6. The aqueous epoxy curing agent according to claim 1, wherein the reaction raw materials of the aqueous epoxy curing agent further comprise: e) 0 to 0.075 parts of an alkaline-neutralizing agent; f) 0.4 to 2 parts of water; and g) 0 to 0.5 parts of an unmodified polyetheramine;
    the alkaline-neutralizing agent is selected from one or more of sodium hydroxide, potassium hydroxide, trimethylamine, and diethylamine; and
    the unmodified polyetheramine is a polyetheramine with a molar mass of 200 g/mol to 5000 g/mol, and the functionality of the unmodified polyetheramine is 2 or 3.

7. The aqueous epoxy curing agent according to claims 1, wherein the aqueous epoxy curing agent further comprises a compound having sulfonic acid or sulfonate groups, which constitutes 2 wt % to 7 wt %, of the total weight of the aqueous epoxy curing agent.

8. A preparation method for the aqueous epoxy curing agent according to claims 1, comprising the following steps: subjecting the polyepoxy compound to a ring-opening reaction with the multifunctional compound to obtain an intermediate product i; and subjecting the intermediate product i to an end-capping reaction with the monoepoxy compound and the sultone to obtain the aqueous epoxy curing agent.

9. The preparation method according to claim 8, wherein in the ring-opening reaction, the polyepoxy compound is added dropwise to the multifunctional compound, wherein the reaction duration of the ring-opening reaction is 0.5 hours to 4 hours, and the reaction temperature of the ring-opening reaction is 60° C. to 100; and/or
    the reaction raw materials of the aqueous epoxy curing agent further comprise 0.4 to 2 parts of water; in the end-capping reaction, water is added for dispersion and viscosity reduction, then the monoepoxy compound is added dropwise to the reaction system, and finally the sultone is added and reacted for 10 minutes to 30 minutes,
    wherein the reaction duration for adding the monoepoxy compound is 0.5 hours to 2 hours, and the reaction temperature of the end-capping reaction is 60° C. to 100° C.

10. The preparation method according to claim 8, further comprising: after the competition of the ring-opening reaction, subjecting the reaction system to reduced pressure distillation; and/or
    the reaction raw materials of the aqueous epoxy curing agent further comprise 0 to 0.075 parts of an alkaline-neutralizing agent and 0 to 0.5 parts of an unmodified polyetheramine, and after the competition of the end-capping reaction, the alkaline-neutralizing agent is added to perform a neutralization reaction, or the alkaline-neutralizing agent and the unmodified polyetheramine are added.

11. The preparation method according to claims 8, wherein the amine value of the aqueous epoxy curing agent is 100 mgKOH/g to 500 mgKOH/g;
the solid content of the aqueous epoxy curing agent is 60 wt % to 80 wt %; and
the pH value of the aqueous epoxy curing agent is 8 to 11.5.

12. The preparation method according to claim 8, wherein the amine value of the aqueous epoxy curing agent is 150 mgKOH/g to 350 mgKOH/g.

13. A formulation method of coatings using the aqueous epoxy curing agent prepared by the preparation method according to claim 8 in the formulation of coatings and the curing of an epoxy resin system.

14. The preparation method according to claim 8, wherein the pH value of the aqueous epoxy curing agent is 9 to 11.

15. A formulation method of coatings using of the aqueous epoxy curing agent according to claim 1 in the formulation of coatings and the curing of an epoxy resin system.

16. The aqueous epoxy curing agent according to claim 1, wherein the multifunctional compound is a polyamine compound comprising at least one member selected from the group consisting of ethylenediamine, propylenediamine, butanediamine, 2-methyl-1, 5-pentanediamine, 1,6-hexanediamine, diethylenetriamine, m-xylylenediamine, 1,3-bisaminomethylcyclohexane, 1-ethyl-1,3-propylenediamine, p-aminodicyclohexylmethane, 2,2,4-trimethyl-1,6-hexanediamine, p-xylylenediamine, polyetheramine, triethylenetetramine, tetraethylenepentamine, isophorondiamine, polyethylenimine and diethyltoluenediamine.

17. The aqueous epoxy curing agent according to claim 1, wherein the multifunctional compound comprises at least one member selected from the group consisting of m-xylylenediamine, diethylenetriamine, polyetheramine, isophorondiamine and triethylenetetramine.

18. The aqueous epoxy curing agent according to claim 1, wherein the multifunctional compound comprises a bisamine polyetheramine having a molar mass of 200 g/mol to 1000 g/mol.

19. The aqueous epoxy curing agent according to claim 1, wherein the sultone comprises at least one member selected from the group consisting of propanesultone and butanesultone.

20. The aqueous epoxy curing agent according to claim 1, wherein the aqueous epoxy curing agent further comprises a compound having sulfonic acid or sulfonate groups, which constitutes 2.5 wt % to 6 wt %, of the total weight of the aqueous epoxy curing agent.

* * * * *